L. PASTEUR.
Brewing Beer and Ale.
No. 135,245.    Patented Jan. 28, 1873.
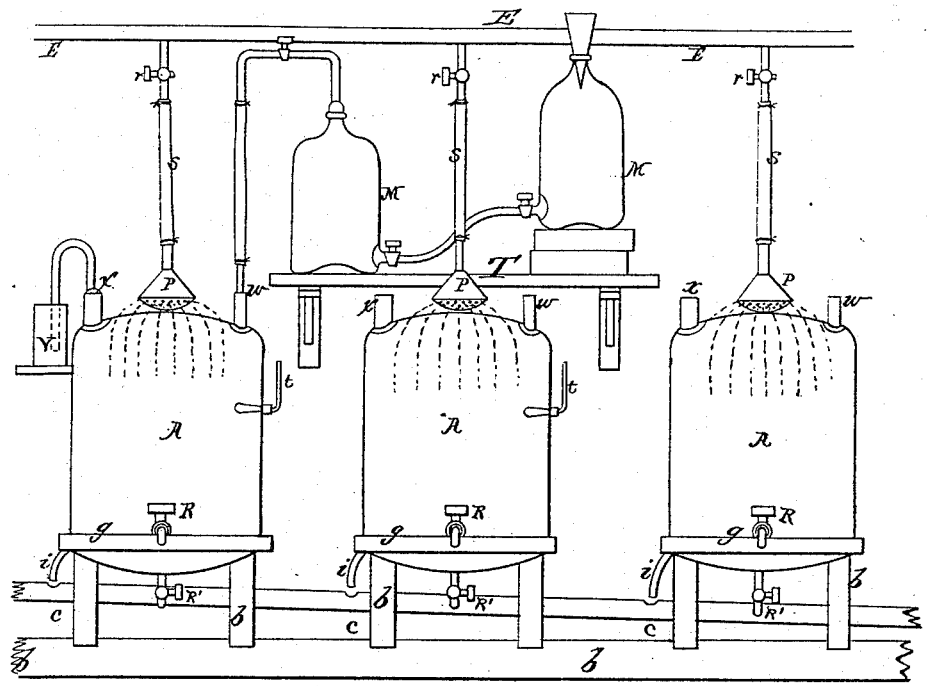
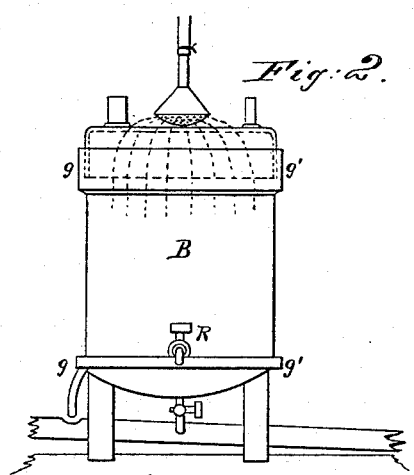

UNITED STATES PATENT OFFICE.

LOUIS PASTEUR, OF PARIS, FRANCE.

IMPROVEMENT IN BREWING BEER AND ALE.

Specification forming part of Letters Patent No. 135,245, dated January 28, 1873.

*To all whom it may concern:*

Be it known that I, LOUIS PASTEUR, of the city of Paris, France, have invented certain new and useful Improvements in the Process of Making Beer, for which Letters Patent were granted to me in France on the 28th day of June, 1871; and I do hereby declare the following to be a full, clear, and exact description thereof, reference being had to the accompanying drawing making part of this specification and the letters of reference marked thereon.

Previous to my invention in the process of making beer it has been customary to permit the exposure of the "wort"—that is, the boiled extract of malt or other material seasoned with hop or other qualifying ingredient—to the action of atmospheric air. I have discovered that by contact in the usual way with air during the process not only is the quality of the beer produced much impaired, but also that a less quantity is made from a given amount of wort than can be otherwise produced.

Based upon this discovery and the idea of performing the process of brewing without the presence in the wort of atmospheric air, my invention has for its object to produce a better quality and greater quantity of beer from the same quantity and quality of wort, and to afford a beer which shall also embody the quality of greater degree of unalterableness during time and changes of climate, &c., in transportation and use; and to these ends my invention consists in expelling the air from the boiled wort while confined in a closed vessel or closed vessels, and then cooling it by the application of sprays of water to the exterior of such vessel or vessels, as will be hereinfter more fully explained.

To enable those skilled in the art to fully understand and practice my improved process for the manufacture of beer, I will proceed to more fully describe it, referring at the same time by letters to the accompanying drawing, in which I have shown an apparatus adapted to carry on my said improved process.

At Figure 1, A A A represent three casks or tanks, which may be made of galvanized iron, wood, or other suitable material, and which are supported on suitable stands *b*, as represented. Above the series of cylinders or vessel A is arranged a water-supply pipe, E, from which depend branch pipes, (one over each of the vessels A,) provided with cocks *r*, and having attached to their lower ends flexible tubes or hose *s*, which in turn carry at their lower extremities spray-nozzles P. Upon a suitable stand or shelf, T, is located an apparatus, M M, for the generation of carbonic-acid gas, which is to be supplied therefrom to the vessels A for purposes to be presently explained, and by means of tubes connected at *w* to the said vessels. The escape of the gas is permitted through exit or escape tubes at *x*, which extend siphon-like into water cups or chambers *v* from whence the gas may be collected in a gasometer.

I have shown the connection of the gas-generator with only one of the vessels; but it will be understood that the others may be similarly connected.

The spray-nozzles P are located about centrally over each of the vessels A, which should be made slightly convex or dome-shaped on top, and so that the jets of water discharged therefrom will fall like rain on the tops of the said vessels and trickle down their sides, as illustrated by the dotted lines in Fig. 1. Around the base of each vessel A is arranged a circular trough, which catches the water and from which the water is led off by a tube, *i*, into a conductor or discharge-trough, *c*, which carries it to any desired destination. R' are cocks through which the contents of the vessels may be discharged into other vessels for the permanent retention of it, and R are faucets, which are used to draw off the beer for use, when it shall have been left or allowed to remain in the vessels A, as will be presently explained.

At Fig. 2 is illustrated a modification of the vessel or cask, in which, in lieu of being closed permanently at the top, said vessel B is made with a removable top, and is provided with the usual and necessary water-gages, thermometers, man-holes, &c., common to such contrivances.

The following explanation in connection with the foregoing description of apparatus will suffice to convey a full exposition of my improved process: The wort prepared in the usual manner, and while yet boiling hot, is introduced into the vessel A, into which a current of carbonic-acid gas is then conveyed for the purpose of expelling all contained air, and the water-spray is then let on to the vessels to cool them and their contents. As soon as the temperature of the charge has been reduced to about from 16° to 18° Reaumur, the yeast or pure ferment is added to provoke or induce fermentation. After this fermentation, or the first fermentation, the contents of the vessels A may be drawn off through the cocks R' into casks or barrels for future use, and in which the usual and further fermentation goes on, from which the beer becomes both clear and bright.

In lieu of drawing off the beer thus into barrels it may be allowed to remain, when the apparatus is not needed further, in the vessels A, and therein complete its fermentation, and be drawn for use through the faucets R; but in this case, or where it is desired to accelerate or make more complete the first fermentation, it may be found desirable to introduce a small quantity of air into the vessel, first, however, passing the air through a hot tube, or at least filtering it through cotton, for the purpose of either killing or extracting any germs which it may contain.

The apparatus which I have shown is adapted to the working of small quantities —say about one barrel; but it is obvious that the capacity of the apparatus may be varied at pleasure to manufacture more or less extensively.

In conducting my new mode of manufacture or process, the carbonic-acid gas generated from the fermentation of the wort may be collected properly in a gasometer, of course, and employed in lieu of or in connection with that derived from a generator, such as shown, and which is necessary for the first operation, it being important always to effect a thorough penetration of the mass by the carbonic-acid gas to expel all contained air.

It will be understood that by my improved process not only are the usual cooling-vessels dispensed with and all loss by evaporation prevented, but that the quality of the beer and its alcoholic gradation are improved and a larger quantity produced from a given supply of material.

I have found that by my new process the beer produced possesses in an eminent degree the capacity of unchangeableness, and can be transported without detriment or deterioration; and that in the use of my process, by which I am enabled to brew in all seasons and in most any climate successfully, the product is more aromatic and is perfectly limpid.

What I claim as new in the process of brewing or in the manufacture of beer is—

Subjecting the wort to a process for the expulsion of the air and cooling it off, substantially as and for the purposes set forth.

In testimony whereof I have hereunto set my hand this 8th day of December, 1871.

LOUIS PASTEUR.

Witnesses:
CAYON,
GRENET FYRE.